US006372332B1

(12) United States Patent
Arai et al.

(10) Patent No.: US 6,372,332 B1
(45) Date of Patent: Apr. 16, 2002

(54) THERMOSENSITIVE STENCIL PAPER AND METHOD OF PRODUCING THE SAME

(75) Inventors: Fumiaki Arai, Shizuoka; Takehiko Iwaoka, Kanagawa; Yuji Natori; Masanori Rimoto, both of Shizuoka, all of (JP)

(73) Assignees: Ricoh Company, Ltd., Tokyo; Tohoku Ricoh Co., Ltd., Miyagi-ken, both of (JP)

( * ) Notice: Subject to any disclaimer, the term of this patent is extended or adjusted under 35 U.S.C. 154(b) by 0 days.

(21) Appl. No.: 09/204,603

(22) Filed: Dec. 3, 1998

(30) Foreign Application Priority Data

| | | |
|---|---|---|
| Dec. 4, 1997 | (JP) | 9-350024 |
| Dec. 2, 1998 | (JP) | 10-343365 |

(51) Int. Cl.[7] .................. B32B 7/02

(52) U.S. Cl. .................. 428/304.4; 428/195; 428/423.1; 428/500

(58) Field of Search .................. 428/195, 409, 428/137, 220, 314.8, 317.9, 143, 318.4, 318.6, 423.3, 304.4

(56) References Cited

U.S. PATENT DOCUMENTS

| | | | | | |
|---|---|---|---|---|---|
| 5,643,680 | A | * | 7/1997 | Osaki et al. | 428/480 |
| 5,707,712 | A | * | 1/1998 | Fujimura et al. | 428/195 |
| 5,709,146 | A | * | 1/1998 | Watanabe | 101/128.21 |
| 5,718,170 | A | * | 2/1998 | Watanabe | 101/128.21 |
| 5,843,560 | A | * | 12/1998 | Ohta et al. | 428/137 |
| 5,888,653 | A | * | 3/1999 | Kawatsu et al. | 428/409 |
| 6,050,183 | A | * | 4/2000 | Tanaka et al. | 101/128.21 |
| 6,096,374 | A | * | 8/2000 | Ohta et al. | 427/148 |

FOREIGN PATENT DOCUMENTS

| | | |
|---|---|---|
| EP | 0575644 | 12/1993 |

* cited by examiner

*Primary Examiner*—Cynthia H. Kelly
*Assistant Examiner*—Betelhem Shewareged
(74) *Attorney, Agent, or Firm*—Cooper & Dunham LLP

(57) ABSTRACT

A thermosensitive stencil paper having a thermoplastic resin film and a porous resin layer which is provided on the thermoplastic resin film by coating a porous resin layer formation coating liquid including a water-in-oil emulsion of a resin on the thermoplastic resin film and drying the coating liquid. In addition, the method of producing the above-mentioned thermosensitive stencil paper is also disclosed.

9 Claims, No Drawings

THERMOSENSITIVE STENCIL PAPER AND METHOD OF PRODUCING THE SAME

BACKGROUND OF THE INVENTION

1. Field of the Invention

The present invention relates to a thermosensitive stencil paper and a method of producing the same, and particularly to a thermosensitive stencil paper comprising a thermoplastic resin film and a porous resin layer provided thereon, from which a printing master with excellent quality can be produced by use of a heating element such as a thermal head, and also to a method of producing such a thermosensitive stencil paper.

2. Discussion of Background

There is conventionally known a thermosensitive stencil paper which is prepared by attaching a thermoplastic resin film to a substrate with an ink-permeability property, such as a porous tissue paper, with an adhesive. Further, a sticking preventing layer is overlaid on the thermoplastic resin film to prevent the thermoplastic resin film from sticking to a thermal head when perforations are made in the resin film by the application of heat thereto. In practice, a porous tissue paper is made out of hemp fiber, synthetic fiber or wood fiber, which may be used in combination, and the thus prepared tissue paper and the thermoplastic resin film are laminated with an adhesive, and then a sticking preventing layer is provided on the surface of the resin film. Such a thermosensitive stencil paper is widely used in practice.

However, the above-mentioned conventional thermosensitive stencil paper has the following drawbacks:

(1) Since the fibers for use in the tissue paper such as a Japanese paper are partially superimposed therein, the adhesive is unfavorably accumulated at the portion where the thermoplastic resin film is brought into contact with the superimposed fibers in the tissue paper. A perforation cannot be easily formed in such a portion as mentioned above even by the application of thermal energy using the thermal head. Accordingly, the ink cannot permeate through the stencil paper at that portion, and therefore, non-printed spots tend to appear in a solid image when a solid image is printed on an image-receiving medium using a printing master prepared from the above-mentioned thermosensitive stencil paper.

(2) The fibers themselves contained in the porous tissue paper hinder the printing ink from penetrating through the stencil paper, so that the printed images tend to become uneven.

(3) Because of expensive fibers for use in the tissue paper, the cost of the thermosensitive stencil paper increases.

To solve the above-mentioned problems, there are proposed improved thermosensitive stencil papers. For example, in Japanese Laid-Open Patent Application 3-193445, a porous substrate comprising microfibers with a fineness of 1 denier or less is employed for a thermosensitive stencil paper. Although the above-mentioned problem (2) can be solved by this thermosensitive stencil paper, the problems (1) and (3) remain unsolved.

In Japanese Laid-Open Patent Application 62-198459, there is disclosed a method of producing a printing master by forming a heat resistant resin pattern which is substantially continuous on the thermoplastic resin film by gravure printing, offset printing or flexography. According to the above-mentioned printing technology, it is still difficult to print a pattern with a line width of 50 μm or less. Even though the formation of such a pattern can be achieved, the productivity is very poor and the cost is remarkably increased. In addition, when the line width is 30 μm or more, the heat resistant resin hinders the perforation from being clearly made, so that the printed image becomes uneven.

Furthermore, a thermosensitive stencil paper disclosed in Japanese Laid-Open Patent Application 3-240596 is prepared by coating a mixture of a water-dispersed polymer and finely-divided particles of colloidal silica on the surface of a thermoplastic resin film and drying the above-mentioned mixture. Thus, a porous layer is provided on the thermoplastic resin film. From the thus prepared thermosensitive stencil paper, a printing master is produced, for example, using a commercially available printing master making apparatus "PRINT GOCCO" (Trademark), made by Riso Kagaku Corporation, and then, a printed image can be obtained from such a printing master by applying a commercially available jet printing ink (Trademark "HG-4800 Ink", available from EPSON HANBAI Co., Ltd.) to the printing master.

The pores formed in the above-mentioned porous resin layer are remarkably fine, and the density of the porous layer is very high, so that the penetrability of the printing ink through the stencil paper becomes poor. Therefore, when a thermosensitive stencil ink for general use of which viscosity is about 150 poise or more at 20° C., that is, still higher than the viscosity of the jet printing ink (with a viscosity of 0.1 poise or less at 20° C.) is employed for producing a printed image, sufficient image density cannot be obtained in practical use.

Japanese Laid-Open Patent Application 54-33117 discloses a thermosensitive stencil paper consisting of a thermoplastic resin film. By this application, the previously mentioned problems (1) to (3) caused by the conventional thermosensitive stencil papers can be solved because a porous substrate such as a tissue paper is not employed.

However, there occurs another problem that the stiffness of the stencil paper becomes low when the thickness of the thermoplastic resin film is 10 μm or less. In such a case, transportation of the stencil paper causes annoyance in the printing machine. To solve such a problem of troublesome transportation, as disclosed in Japanese Patent Publication 5-70595, it is proposed to subject a printing master prepared from the thermosensitive stencil paper to the printing operation in such a fashion that the printing master is not cut, but used in a continuous length. By winding the printing master in a continuous length round the periphery of the plate cylinder of the printing machine, it is possible to prevent the printing master from jamming in the printing machine. However, since the printing master and the feeding and taking-off unit rollers are caused to rotate along with the rotation of the plate cylinder in the printing operation, the turning moment is increased and the displacement from the rotating shaft is increased. Therefore, the printing machine is required to be heavy in this case.

On the other hand, when the thickness of the above-mentioned thermosensitive stencil paper consisting of the thermoplastic film is 5 μm or more, the thermal sensitivity becomes so poor that perforations cannot be easily formed in the film when thermal energy is applied to the stencil paper by use of a thermal head.

The inventors of the present invention have already proposed a thermosensitive stencil paper which comprises a thermoplastic film and a porous resin layer formed on one side of the thermoplastic film, as disclosed in Japanese Laid-Open Patent Application 10-24667. Printed images obtained from the above-mentioned thermosensitive stencil paper become clearer than those obtained from a printing master prepared from the conventional thermosensitive stencil paper comprising a porous tissue paper as the substrate. However, the following problems are generated:

(1) A porous resin layer (e.g. butyral resin layer) is formed by separating the resin component from a mixed solvent comprising a good solvent and a bad solvent with respect to the employed resin. In order to obtain the optimal area of pores in the obtained resin layer, it is necessary to increase the amount of bad solvent. In this case, however, the coating liquid for the formation of the porous resin layer becomes unstable, so that gelation or separation tends to easily take place in the coating liquid. Therefore, it is required to severely control the temperature of the coating liquid and the amount ratio of the good solvent to the bad solvent.

(2) It takes a considerable time to evaporate the above-mentioned good solvent so as to deposit the resin layer on the thermoplastic film. Therefore, the coating operation must be carried out very slowly to obtain an appropriate porous resin layer, thereby decreasing the production efficiency.

SUMMARY OF THE INVENTION

Accordingly, it is a first object of the present invention to provide a thermosensitive stencil paper comprising a porous resin layer which is formed by coating a porous resin layer formation coating liquid on one side of a thermoplastic resin film so that the properties of the obtained porous resin layer in terms of the pore size and the permeability of the obtained porous resin layer may be made stable, with the porous resin layer formation coating liquid causing no gelation or separation in the course of coating operation.

A second object of the present invention is to provide a thermosensitive stencil paper comprising a porous resin layer which is formed by coating a porous resin layer formation coating liquid on one side of a thermoplastic resin film at high coating speed, thereby increasing the productivity of the thermosensitive stencil paper.

A third object of the present invention is to provide a thermosensitive stencil paper comprising a porous resin layer, with the stencil paper having high stiffness and sufficient sensitivity for making the perforations therein so as to obtain a solid image without non-printed spots, and free of the offset problem.

A fourth object of the present invention is to provide a method of producing such a thermosensitive stencil paper.

The first to third objects of the present invention can be achieved by a thermosensitive stencil paper comprising a thermoplastic resin film and a porous resin layer which is provided on the thermoplastic resin film by coating a porous resin layer formation coating liquid comprising a water-in-oil (W/O) emulsion of a resin on the thermoplastic resin film and drying the coating liquid.

In the above porous resin layer formation coating liquid, the water-in-oil emulsion may be prepared by use of an emulsifier.

It is preferable that the resin for use in the water-in-oil emulsion be a thermoplastic resin, more preferably a polyurethane resin or a polyvinyl butyral resin.

In addition, the porous resin layer formation coating liquid may further comprises a filler.

Further, it is preferably that the porous resin layer have pores with a diameter of 5 $\mu$m or more therein, with such pores occupying an area of 4 to 80% of the entire surface area of the porous resin layer, provided that the pore diameter is obtained by converting the form of a pore into a true round.

Furthermore, it is desirable that the thermoplastic resin film exhibit a permeability of 1.0 to 157 $cm^3/cm^2 \cdot sec$ when perforations are made in the thermoplastic resin film corresponding to a solid image portion so that the perforations may occupy an area of 40% or more of the entire area of the solid image portion.

The thermosensitive stencil paper may exhibit a bending rigidity of 5 mN or more.

When the thermoplastic resin for use in the W/O emulsion is a polyurethane resin, the water-in-oil emulsion may be prepared in such a manner that a dispersion of the polyurethane resin is prepared by dispersing finely-divided particles in a polyurethane resin solution, the finely-divided particles being produced by allowing an active hydrogen containing polyfunctional compound to react with an organic polyisocyanate, and the polyurethane dispersion is prepared into the water-in-oil emulsion.

The fourth object of the present invention can be achieved by a method of producing a thermosensitive stencil paper comprising a thermoplastic resin film and a porous resin layer provided thereon, comprising the steps of coating on the thermoplastic resin film a porous resin layer formation coating liquid comprising a water-in-oil emulsion of a resin, and drying the coating liquid, thereby providing the porous resin layer on the thermoplastic resin film.

To be more specific, the porous resin layer formation coating liquid may be prepared in such a manner that the resin and an emulsifier are dissolved in a good solvent with respect to the resin to prepare a resin solution, and a non-solvent with respect to the above-mentioned resin is added dropwise to the resin solution with stirring.

Alternatively, the resin layer formation coating liquid may be prepared in such a manner that the resin is dissolved in a good solvent with respect to the resin to prepare a resin solution, and a non-solvent with respect to the above-mentioned resin which comprises an emulsifier is added dropwise to the above prepared resin solution with stirring.

DESCRIPTION OF THE PREFERRED EMBODIMENTS

By the conventional method, a porous resin layer is provided on the thermoplastic film by coating a porous resin layer formation coating liquid which comprises a resin component and a mixed solvent of a good solvent and a bad solvent with respect to the above-mentioned resin component, and drying the coated porous resin layer formation coating liquid. In the course of the drying step, the good solvent is first evaporated, thereby precipitating the resin component. Thereafter, the bad solvent, for instance, water, is eliminated by heating.

According to the above-mentioned conventional method, the porous resin layer formation coating liquid is unstable and the pores formed in the porous resin layer are uneven. In contrast to this, the porous resin layer formation coating liquid for use in the present invention is very stable because the water-in-oil resin emulsion which is stabilized by use of an emulsifier is used as the coating liquid. In addition, the diameters of pores formed in the porous resin layer thus obtained by coating and drying the above-mentioned coating liquid are remarkably uniform because water droplets in the water-in-oil resin emulsion have uniform diameters.

According to the present invention, stable coating of the porous resin layer formation coating liquid can be attained, and the coating speed can be increased. Accordingly, the thermosensitive stencil paper can be obtained with high production efficiency. Stable coating can be attained because the coating liquid is stable for a long period of time after the preparation thereof. The reason why the coating speed can be increased is that pores are formed as the water droplets contained in the coated porous resin layer formation coating liquid are evaporated. Therefore, the porous layer can be speedily formed. In contrast to this, the mixed solvent of a bad solvent and a good solvent is employed in the conventional method, as mentioned above. The evaporation of the mixed solvent requires much time.

The thermosensitive stencil paper of the present invention can exhibit high stiffness because the above-mentioned porous resin layer is provided on the thermoplastic resin film. In addition, since the surface smoothness of the porous resin layer for use in the present invention is higher than that of a Japanese paper serving as a porous substrate for use in the conventional thermosensitive stencil paper, the sensitivity for formation of the perforations is improved, and therefore, the perforations can be sharply formed. As a result, non-printed spots are not observed in a solid image portion when the image printing is carried out using a printing master prepared from the thermosensitive stencil paper of the present invention. In addition, the diameters of the pores formed in the porous resin layer are smaller than those formed in a Japanese paper, so that the amount of printing ink spread on the porous resin layer is smaller. As a result, occurrence of the so-called offset problem can be minimized.

The thermosensitive stencil paper of the present invention comprises a thermoplastic resin film and a porous resin layer formed on one side of the thermoplastic resin film. Various kinds of polymers can be employed for the preparation of the W/O resin emulsion.

Specific examples of the resin for use in the W/O resin emulsion are acrylic polymer, ester polymer, urethane polymer, polyvinyl butyral, olefin polymer, vinylidene chloride polymer, epoxy polymer, amide polymer, styrene polymer, modified polymers of the above-mentioned polymers, and copolymers comprising monomers constituting the above-mentioned polymers.

In particular, W/O emulsions of a polyurethane polymer and a polyvinyl butyral are preferably employed as the porous resin layer formation coating liquids. Namely, polyurethane resins and polyvinyl butyral resins are preferably employed as the resins for the preparation of the W/O resin emulsion.

When the W/O emulsion of the polyurethane resin or the polyvinyl butyral resin prepared by use of an emulsifier is used as the coating liquid, a preferable porous resin layer can be obtained.

To obtain a W/O emulsion of polyurethane resin, for instance, a dispersion of the polyurethane resin is first prepared by dispersing finely-divided particles in a polyurethane resin solution, the above-mentioned finely-divided particles being produced by allowing an active hydrogen containing polyfunctional compound to react with an organic polyisocyanate, and the above prepared polyurethane dispersion may be prepared into a water-in-oil emulsion using an emulsifier.

The above-mentioned finely-divided particles for use in the polyurethane dispersion, which are obtained by allowing an active hydrogen containing polyfunctional compound with each functional group having a molecular weight of 50 or less to react with an organic polyisocyanate, are insoluble in the organic solvent in which the polyurethane resin is dissolved.

The polyurethane resin for use in the above-mentioned W/O emulsion can be easily produced in accordance with the conventional method by reacting a polyol, an organic polyisocyanate and a chain extender.

For the synthesis of the polyurethane resin, polyols with a molecular weight of 300 to 4,000, having hydroxyl group at the end group are preferably employed.

Specific examples of such polyols are polyethylene adipate, polyethylene propylene adipate, polyethylene butylene adipate, polydiethylene adipate, polybutylene adipate, polyhexamethylene adipate, polyethylene succinate, polybutylene succinate, polyethylene sebacate, polybutylene sebacate, polytetramethylene ether glycol, poly-ϵ-caprolactone diol, carbonate polyol, and polypropylene glycol.

Further, the above-mentioned polyols may comprise a polyoxyethylene chain in a proper amount. Of those polyols, carbonate polyols are particularly preferable because a relatively hard layer can be obtained.

Specific examples of the organic polyisocyanate are 4,4'-diphenylmethane diisocyanate(MDI), hydrogenated MDI, isophorone diisocyanate, 1,3-xylylene diisocyanate, 1,4-xylylene diisocyanate, 2,4-tolylene diisocyanate, 2,6-tolylene diisocyanate, 1,5-naphthalene diisocyanate, m-phenylene diisocyanate, and p-phenylene diisocyanate.

Further, there can be employed urethane prepolymers prepared by allowing the above-mentioned organic isocyanate to react with a low-molecular polyol and polyamine so as to obtain a terminal isocyanate.

Specific examples of the chain extender are ethylene glycol, propylene glycol, diethylene glycol, 1,4-butanediol, 1,5-hexanediol, ethylenediamine, 1,2-propylenediamide, trimethylenediamine, decamethylenediamine, isophorone diamine, m-xylylenediamine, and hydrazine.

When the preparation of the W/O emulsion of polyurethane resin is taken into consideration, it as advantageous that the synthesis of polyurethane resin be carried out in an organic solvent which is compatible with water to some extent.

Specific examples of such an organic solvent are methyl ethyl ketone, methyl-n-propyl ketone, methyl isobutyl ketone, diethyl ketone, methyl formate, ethyl formate, methyl acetate, ethyl acetate, butyl acetate, acetone, cyclohexane, tetrahydrofuran, dioxane, methanol, ethanol, butanol, isopropyl alcohol, toluene, xylene, dimethylformamide, dimethyl sulfoxide, methyl cellosolve, butyl cellosolve, and cellosolve acetate.

Of the above-mentioned organic solvents, the one that is infinitely compatible with water and the other that is never compatible with water may be used in combination with a hydrophobic solvent and a hydrophilic solvent, respectively. In addition, the organic solvent with a boiling point of 120° C. or less is preferably employed because the drying speed is fast.

The finely-divided particles for use in the polyurethane dispersion can be obtained by mixing the active hydrogen containing polyfunctional compound, with each functional group having a molecular weight of 50 or less and the organic polyisocyanate at an arbitrary ratio. More preferably, the amount of the active hydrogen containing polyfunctional compound may be an equimolar amount with respect to the amount of the organic polyisocyanate. Thus, the reaction may be carried out at temperature in the range of 0 to 150° C. over a period of 2 to 15 hours.

As the active hydrogen containing polyfunctional compound, with each functional group having a molecular weight of 50 or less, not only the previously mentioned chain extender, but also the following compounds are usable: monoethanolamine, diethanolamine, triethanolamine, diethylenetriamine, triethylenetetramine, tetramethylenetetramine, glycerin, trimethylolpropane, and pentaerythritol.

One of the methods for obtaining the aforementioned polyurethane dispersion is that the finely-divided particles produced by allowing the active hydrogen containing polyfunctional compound to react with the organic polyisocyanate are added to the polyurethane resin solution. In light of the manufacturing steps, it is more favorable that the active hydrogen containing polyfunctional compound be allowed to react with the organic polyisocyanate in the polyurethane resin solution to produce the finely-divided particles therein.

The particle size of the above-mentioned finely-divided particles, which is not particularly limited, is preferably in the range of 0.1 to 5 μm. Further, it is preferable that the amount of the finely-divided particles be in the range of 30 to 300 parts by weight with respect to 100 parts by weight of the polyurethane resin component.

To prepare a W/O emulsion of the polyurethane resin from the above-mentioned polyurethane resin dispersion, a W/O type emulsifier is added to the polyurethane resin dispersion when necessary, and to the thus obtained mixture, water may be added in an amount of about 50 to 800 parts by weight with respect to 100 parts by weight of the solid content of the polyurethane resin, with vigorously stirring.

In this case, conventional W/O type emulsifiers are usable. In particular, a polyurethane based surfactant comprising a polyoxyethylene chain in its molecule is preferably employed in the present invention. It is preferable that the amount of the W/O type emulsifier be in the range of 1 to 10 parts by weight with respect to 100 parts by weight of the solid content of the polyurethane resin solution.

The previously mentioned polyurethane resin dispersion and W/O polyurethane emulsion can be produced by the above-mentioned methods. Alternatively, the commercially available product "Hi-muren" (Trademark), made by DainichiSeika Color and Chemicals Mfg. Co., Ltd. is available.

Basically, any thermoplastic resin is usable as the resin for use in the porous resin layer so long as the combination of the resin, the solvent, the non-solvent, and the emulsifier for use in the porous resin layer formation coating liquid is proper. As previously mentioned, it is found that the W/O emulsion of the polyvinyl butyral resin can also form an excellent porous resin layer.

The representative structure of the polyvinyl butyral resin for use in the present invention is shown below.

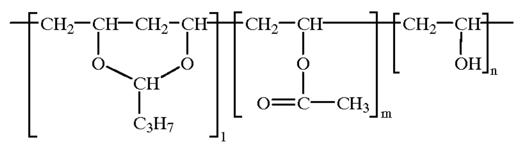

As shown in the above formula, the polyvinyl butyral resin has a vinyl linkage skeleton with acetyl group, butyral group and hydroxyl group. The viscosity, heat resistance and solubility in a solvent considerably varies depending upon the degree of polymerization and the contents of the above-mentioned radical groups. Therefore, the combination of the polyvinyl butyral resin, the solvent and the non-solvent may be determined in light of the molar ratios of the radical groups contained in the polyvinyl butyral resin.

To prepare the water-in-oil emulsion for use in the present invention, an emulsifier with strong lipophilic nature, to be more specific, with a hydrophilic-lipophilic balance (HLB) of 4 to 8 is effective. Further, the water-in-oil emulsion becomes more stable and more uniform by using a hydrophilic emulsifier with an HLB of 8 to 20 for the water layer of the emulsion. In addition to the above, the use of a high-molecular weight emulsifier is one of the methods for obtaining a more stable and uniform water-in-oil emulsion. Furthermore, when a high-molecular weight emulsifier and a low-molecular weight emulsifier are used in combination, a remarkably stable emulsion can be obtained effectively.

Specific examples of the low-molecular weight emulsifiers include nonionic emulsifiers such as polyoxyethylene and derivatives thereof, sorbitan derivatives and ether-modified silicone oil; and anionic emulsifiers such as sulfonates, sulfates and phosphates.

Specific examples of the high-molecular weight emulsifier include partially saponified polyvinyl alcohol, alkyl halide quaternized polyvinyl pyridine, polyvinyl acetate, methyl polymethacrylate, albumin, styrene-acrylic acid copolymer, ethylene-acrylic acid copolymer, styrene-maleic acid copolymer, carboxyl-group-containing styrene-maleic acid ester copolymer, methyl cellulose, and carboxymethylcellulose (CMC).

As the emulsifier, a low-molecular weight and a high-molecular weight emulsifiers are usable as mentioned above. The emulsifier may be dissolved in one of the above-mentioned solvent or non-solvent, or different kinds of emulsifiers may be dissolved in the solvent and the non-solvent. The emulsifiers may be determined in accordance with the combination of the solvent and the non-solvent, with the solubilities and the HLB balance of the emulsifiers being taken into consideration.

The W/O resin emulsion serving as the porous resin layer formation coating liquid may further comprise a filler such as a pigment. By the addition of the filler to the coating liquid, the penetration of the printing ink through the obtained porous resin layer is favorably improved. As a result, the image density of the printed image is increased. In addition, the thermosensitive stencil paper can be prevented from curling due to the addition of the filler.

When necessary, the porous resin layer formation coating liquid may further comprise a crosslinking agent, an anti-static agent, an agent for preventing the sticking, a wetting agent, an antiseptic and an anti-foaming agent.

The porous resin layer is provided with relatively uniform pores. It is desirable that the pores with a diameter of 5 μm or more occupy an area of 4 to 80% of the entire surface area of the porous resin layer, provided that the pore diameter is obtained by converting the form of a pore into a true round. When the area ratio of the above-mentioned pores is 4% or more, the perforations can be satisfactorily made by the thermal head, and the penetration of the printing ink through the stencil paper is not hindered. When the area ratio of the pores is 80% or less, the amount of ink to penetrate through the stencil paper can be well controlled, so that occurrence of the offset problem can be minimized and image blurring can be prevented.

It is preferable that the deposition amount of the porous resin layer by in the range of 2 to 30 g/m$^2$, more preferably in the range of 5 to 15 g/m$^2$. When the deposition amount of the porous resin layer is 2 g/m$^2$ or more, the bending rigidity of the obtained stencil paper is sufficient, so that the thermosensitive stencil paper can be transported with no difficulty in the printing machine. On the other hand, when the deposition amount of the porous resin layer is 30 g/m$^2$ or less, the printing ink in a proper amount can penetrate through the porous resin layer, so that high image quality can be maintained.

It is preferable that the density of the porous resin layer be in the range of 0.1 to 1 g/cm$^3$, more preferably in the range of 0.3 to 0.7 g/cm$^3$. When the density of the porous resin layer is within the above-mentioned range, the strength of the porous resin layer is sufficient and a desired stiffness of the thermosensitive stencil paper can be obtained.

As previously explained, the structure of the porous resin layer for use in the present invention is quite different from that of the porous substrate for use in the conventional thermosensitive stencil paper, for example, as disclosed in Japanese Laid-Open Patent Application 3-240596, for which a jet printing ink with a remarkably low viscosity is employed.

In view of the penetrability of the printing ink, it is desirable that the pores formed in the porous resin layer penetrate therethrough in the direction of thickness thereof.

The viscosity of the porous resin layer formation coating liquid may be adjusted by adding the organic solvent and water in proper amounts to the previously mentioned W/O emulsion of resin. The thus obtained coating liquid is applied to one side of the thermoplastic resin film and dried, thereby providing a porous resin layer on the thermoplastic resin film.

Furthermore, in order to prevent the thermosensitive stencil paper from sticking to the thermal head in the course of making the perforations in the thermoplastic resin film, the thermosensitive stencil paper may further comprise a sticking preventing layer which is provided on the other side of the thermoplastic resin film, opposite to the porous resin layer with respect to the thermoplastic resin film.

The sticking preventing layer may comprise, for example, a silicone releasant such as a silicone oil, fluorine-containing releasant, or phosphate surfactant.

As the thermoplastic resin film for use in the thermosensitive stencil paper of the present invention, the thermoplastic films used in the conventional thermosensitive stencil papers can be used. In particular, a polyester film in which perforations can be readily made with the application of a low energy thereto is preferable. For example, there can be employed a polyester film of which heat of fusion is 3 to 11 cal/g (disclosed in Japanese Laid-Open Patent Application 62-149496), a polyester film with a crystallinity index of 30% or less (disclosed in Japanese Laid-Open Patent Application 62-282983), and a polyester film comprising a butylene terephthalate unit in an amount of 50 mol % or more (disclosed in Japanese Laid-Open Patent Application 2-158391).

It is preferable that the thickness of the thermoplastic resin film be in the range of 0.5 to 5 $\mu$m, more preferably in the range of 1.0 to 3.5 $\mu$m. When the thickness of the resin film is within the above-mentioned range, the porous resin layer formation coating liquid can be applied to the thermoplastic resin film with no difficulty, and at the same time, the perforations can be clearly made in the thermoplastic resin film by use of the thermal head.

With respect to the stiffness, it is preferable that the bending rigidity of the thermosensitive stencil paper be 5 mN or more, and more preferably in a range of 10 to 50 mN when the transportation properties of the thermosensitive stencil paper is taken into consideration. To be more specific, when the bending rigidity is 5 mN or more, there is no difficulty in the transportation of the printing master prepared from the thermosensitive stencil paper in the printing machine. On the other hand, when the bending rigidity is extremely high, the obtained printing master is lacking in flexibility when transported over the roller in the printing machine.

In contrast to the thermosensitive stencil paper of the present invention, one type of the conventional thermosensitive stencil papers comprising a Japanese paper and a thermoplastic film shows a bending rigidity of 200 mN, and the other type that consists of a thermoplastic film alone shows a bending rigidity of 1 mN.

The bending rigidity of the thermosensitive stencil paper according to the present invention can be adjusted by controlling the deposition amount of the porous resin layer and adding a filler to the porous resin layer formation coating liquid. In the present invention, the bending rigidity is measured by use of a commercially available stiffness tester made by Lorentzen & Wettre Corporation.

When the perforations are made in the thermoplastic resin film corresponding to a solid image portion so that the perforations may occupy an area of 40% or more of the entire area of the solid image portion, it is preferable that the permeability of the thermoplastic resin film be in a range of 1.0 cm$^3$/cm$^2$•sec to 157 cm$^3$/cm$^2$•sec, more preferably in a range of 10 cm$^3$/cm$^2$•sec to 80 cm$^3$/cm$^2$•sec.

When the permeability of the thermoplastic resin film side is 1.0 cm$^3$/cm$^2$•sec or more, sufficient printing density can be obtained. If the image density of the printed image is insufficient, a low-viscosity ink must be employed. In this case, the printed image tends to be blurred, or the printing ink tends to ooze out from the edge of the printing master which is wound round the printing drum in the course of image printing operation. Further, when the permeability of the thermoplastic resin film side is 157 cm$^3$/cm$^2$•sec or less, extreme increase in the printing density can be avoided, so that offset problem or image blurring can be prevented. The permeability of the thermosensitive stencil paper of the present invention can be appropriately controlled within the above-mentioned range.

In the present invention, the method of measuring the permeability of the thermoplastic resin film is as follows:

The perforations are made in the thermoplastic resin film side of the thermosensitive stencil paper corresponding to a solid image chart of 10 cm×10 cm, using a commercially available stencil printing machine "PRIPORT VT3820" (Trademark), made by Ricoh Company, Ltd., equipped with a thermal head, thereby obtaining a printing master. The permeability of the thus obtained printing master is measured by use of a measuring instrument (Trademark "Permeameter" made by Toyo Seiki Seisaku-sho, Ltd.).

Since the porous resin layer is too thin to peel it from the thermoplastic resin film, the permeability is measured after providing the porous resin layer on the thermoplastic resin film.

As mentioned above, the permeability is measured when the perforations corresponding to a solid image occupy an area of 40% or more of the entire area of the solid image portion. The area ratio of perforations is a ratio of the total area of the penetrating perforations formed in the thermoplastic resin film corresponding to a solid image by the application of thermal energy to the thermoplastic resin film by use of, for example, a thermal head, laser beam or flashlamp, to the entire area of the solid image.

To be more specific, the area ratio of perforations is measured by following the procedure as shown below.

After making the perforations in the thermoplastic resin film corresponding to a solid image, a picture of perforations-bearing part of the thermoplastic resin film is taken under an optical microscope at 100 power. A copy of this picture is made at a magnification of 200×, using a commercially available copying machine (Trademark "IMAGIO MF530", made by Ricoh Company, Ltd.). A transparent film sheet for overhead projector (OHP film) is placed over the above obtained copy sheet so as to trace the perforations on the OHP film. Then, a scanner with a dot density of 300 dpi and a gradation of 256 is passed across the thus obtained OHP film to read the contents of the OHP film, and the contents of the OHP film are converted to two-valued data using a commercially available image processing software (Trademark "Adobe Photoshop 2.5J", made by Adobe System Incorporated). Then, the total area of the perforations is obtained using an image analyzing software "NiH Image" (available from the Internet), and the area ratio is calculated.

The method of producing the thermosensitive stencil paper of the present invention will now be explained in detail.

The porous resin layer formation coating liquid comprises a thermoplastic resin which can constitute the porous resin layer, a solvent for the above-mentioned thermoplastic resin, an emulsifier, and a non-solvent. The aforementioned solvent and non-solvent will separate from each other when mixed in combination. For instance, there can be employed the combination of methyl ethyl ketone and water, ethyl acetate and water, or toluene and water.

In practice, a resin such as a polyurethane resin or a polyvinyl butyral resin is dissolved in a solvent with stirring, or in a solvent in which an emulsifier is dissolved, thereby preparing a resin solution. When necessary, a filler may be added to the resin solution and uniformly dispersed in a ball mill, sand mill or ultrasonic dispersion mixer so as to prepare a uniform dispersion. Thereafter, a predetermined amount of non-solvent, in which an emulsifier may be contained, is added dropwise to the previously mentioned resin solution, whereby an emulsion with uniform particles is obtained.

The above-mentioned emulsification can be achieved by the application of relatively low energy because of the use of an emulsifier. In addition, the emulsification may be carried out using a stirring dispersion mixer for general use. For example, a magnetic stirrer, a homomixer or a marine propeller stirrer may be used in accordance with the scale of production.

The thus obtained porous resin layer formation coating liquid is uniformly coated on the surface of the thermoplastic resin film using a blade coater, wire bar coater, reverse-roll coater, gravure coater, or die coater. Then, the coated liquid is exposed to hot air or infrared rays for drying. When a low boiling point solvent is used for the coating liquid, it is preferable to carry out the coating operation in a closed system, and in this case, the die coater is preferably employed as the coating means. Further, the thermoplastic resin film tends to cause heat shrinkage when exposed to high temperature. In light of the above-mentioned properties of the thermoplastic resin film, the porous resin layer formation coating liquid applied to the surface of the thermoplastic resin film may be dried at 60° C. or less.

Other features of this invention will become apparent in the course of the following description of exemplary embodiments, which are given for illustration of the invention and are not intended to be limiting thereof.

EXAMPLE 1

100 parts by weight of a dispersion of polycarbonate polyurethane ("X-550-1" made on an experimental basis by DainichiSeika Color and Chemicals Mfg. Co., Ltd.) with a solid content of 23 wt. % were added to a mixed solvent of 22 parts by weight of toluene and 37 parts by weight of isopropyl alcohol. The thus obtained mixture was stirred.

Thereafter, a mixture of 115 parts by weight of water and 0.7 parts by weight of a commercially available antistatic agent (Trademark "DSK ELENON No. 19M", made by Daiichi Kogyo Seiyaku Co., Ltd.) was dropwise added to the above prepared liquid with stirring. Thus, a W/O emulsion of polyurethane resin was obtained. This emulsion was stable after allowed to stand for one week.

The above-mentioned W/O emulsion of polyurethane resin was coated on a copolymerized polyester film with a thickness of 2.0 μm and a heat shrinkage ratio of 42% at 150° C. using a slit die coater, with the temperature of the W/O emulsion being maintained at 25° C. The coating speed was controlled to 10 m/min.

Then, the coated liquid was dried using a dryer with a length of 4.5 m (1.5 m×3 zones). The drying temperature for each zone was adjusted to 60° C.

Thus, a porous resin layer with a deposition amount of 7.0 $g/m^2$ was provided on the copolymerized polyester film.

A coating liquid comprising the commercially available antistatic agent (Trademark "DSK ELENON No. 19M", made by Daiichi Kogyo Seiyaku Co., Ltd.) and a silicone oil was coated by a wire bar on the back side of the copolymerized polyester film, opposite to the porous resin layer with respect to the polyester film, and dried at 50° C. Thus, a sticking preventing layer with a deposition amount of 0.04 $g/m^2$ was provided on the back side of the polyester film.

A thermosensitive stencil paper No. 1 according to the present invention was obtained.

EXAMPLES 2 AND 3

The procedure for preparation of the thermosensitive stencil paper No. 1 in Example 1 was repeated except that the coating speed and the drying temperature for the formation of the porous resin layer in Example 1 were changed as shown in Table 1.

TABLE 1

| | Coating Speed | Drying Temperature (° C.) | | |
|---|---|---|---|---|
| | (m/min.) | Zone 1 | Zone 2 | Zone 3 |
| Ex. 1 | 10 | 60 | 60 | 60 |
| Ex. 2 | 20 | 70 | 70 | 60 |
| Ex. 3 | 30 | 80 | 80 | 60 |

Thus, thermosensitive stencil papers No. 2 and No. 3 according to the present invention were obtained.

EXAMPLE 4

22 parts by weight of toluene, 37 parts by weight of isopropyl alcohol, and 2.3 parts by weight of a commercially available filler (Trademark "SEPIOLITE SP", made by Mizusawa Industrial Chemicals, Ltd.) were mixed and dispersed in a ball mill for 5 hours, whereby a pigment dispersion was prepared.

100 parts by weight of a dispersion of polycarbonate polyurethane ("X-550-2" made on an experimental basis by DainichiSeika Color and Chemicals Mfg. Co., Ltd.) with a solid content of 23 wt. % were added to the above prepared pigment dispersion with stirring. The thus obtained mixture was stirred to prepare a uniform dispersion.

Thereafter, a mixture of 130 parts by weight of water and 0.7 parts by weight of a commercially available antistatic agent (Trademark "DSK ELENON No. 19M", made by Daiichi Kogyo Seiyaku Co., Ltd.) was dropwise added to the above prepared uniform dispersion with stirring. Thus, a W/O emulsion of polyurethane resin was obtained. This emulsion was stable after allowed to stand for one week.

The above-mentioned W/O emulsion of polyurethane resin was coated on a copolymerized polyester film with a thickness of 2.0 $\mu$m and a heat shrinkage ratio of 42% at 100° C. using a slit die coater, with the temperature of the W/O emulsion being maintained at 25° C. The coating speed was controlled to 10 m/min.

Then, the coated liquid was dried using a dryer with a length of 4.5 m (1.5 m×3 zones). The drying temperature for each zone was adjusted to 60° C.

Thus, a porous resin layer with a deposition amount of 8.0 g/m$^2$ was provided on the copolymerized polyester film.

A coating liquid comprising the commercially available antistatic agent (Trademark "DSK ELENON No. 19M", made by Daiichi Kogyo Seiyaku Co., Ltd.) and a silicone oil was coated by a wire bar on the back side of the copolymerized polyester film, opposite to the porous resin layer with respect to the polyester film, and dried at 50° C. Thus, a sticking preventing layer with a deposition amount of 0.04 g/m$^2$ was provided on the back side of the polyester film.

A thermosensitive stencil paper No. 4 according to the present invention was obtained.

EXAMPLES 5 AND 6

The procedure for preparation of the thermosensitive stencil paper No. 4 in Example 4 was repeated except that the coating speed and the drying temperature for the formation of the porous resin layer in Example 4 were changed as shown in Table 2.

TABLE 2

| | Coating Speed | Drying Temperature (° C.) | | |
|---|---|---|---|---|
| | (m/min.) | Zone 1 | Zone 2 | Zone 3 |
| Ex. 4 | 10 | 60 | 60 | 60 |
| Ex. 5 | 20 | 70 | 70 | 60 |
| Ex. 6 | 30 | 80 | 80 | 60 |

Thus, thermosensitive stencil papers No. 5 and No. 6 according to the present invention were obtained.

COMPARATIVE EXAMPLE 1

100 parts by weight of the commercially available silica with a solid content of 20 wt. % (Trademark "SNOWTEX UP", made by Nissan Chemical Industries, Ltd.) and 33 parts by weight of water were added to 100 parts by weight of an oil-in-water emulsion of acrylic polymer with a solid content of 50 wt. % with stirring. The above-mentioned acrylic polymer comprised methyl methacrylate, ethyl acrylate and acrylic acid at a ratio by weight of 55:42:3. The resultant mixture was uniformly dispersed, so that a porous resin layer formation coating liquid was prepared.

The above prepared porous resin layer formation coating liquid was coated on the same polyester film as that employed in Example 1 using a wire bar coater, and the coated liquid was dried. The conditions of the coating speed and the drying temperature for the formation of the porous resin layer were the same as those in Example 5. Thus, a porous resin layer with a deposition amount of 8 g/m$^2$ was provided on the copolymerized polyester film.

A sticking preventing layer was provided on the back side of the polyester film in the same manner as in Example 1.

Thus, a comparative thermosensitive stencil paper No. 1 was obtained.

COMPARATIVE EXAMPLE 2

56 parts by weight of methanol and 15 parts by weight of a 30% methanol dispersion of the commercially available filler (Trademark "SEPIOLITE SP", made by Mizusawa Industrial Chemicals, Ltd.) were successively added to 100 parts by weight of a 15% methanol solution of polyvinyl butyral with stirring, so that a uniform dispersion was prepared.

A mixture of 0.5 parts by weight of the commercially available antistatic agent (Trademark "DSK ELENON No. 19M", made by Daiichi Kogyo Seiyaku Co., Ltd.) and 12 parts by weight of water was added dropwise to the above prepared dispersion with stirring, whereby a porous resin layer formation coating liquid was prepared.

Although the thus prepared coating liquid maintained uniform while stirring, the resin component was separated from water in several minutes after stirring was stopped.

The aforementioned porous resin layer formation coating liquid was supplied to a die head with stirring to provide a porous resin layer on the copolymerized polyester film under the same conditions as in Example 1. Thus, a porous resin layer with a deposition amount of 7.0 g/m$^2$ was provided on the polyester film.

In addition, a sticking preventing layer was provided on the back side of the polyester film in the same manner as in Example 1.

Thus, a comparative thermosensitive stencil paper No. 2 was obtained.

COMPARATIVE EXAMPLES 3 AND 4

The procedure for preparation of the comparative thermosensitive stencil paper No. 2 in Comparative Example 2 was repeated except that the coating speed and the drying temperature for the formation of the porous resin layer in Comparative Example 2 were changed as shown in Table 3.

TABLE 3

| | Coating Speed | Drying Temperature (° C.) | | |
|---|---|---|---|---|
| | (m/min.) | Zone 1 | Zone 2 | Zone 3 |
| Comp. Ex. 2 | 10 | 60 | 60 | 60 |
| Comp. Ex. 3 | 20 | 70 | 70 | 60 |
| Comp. Ex. 4 | 30 | 80 | 80 | 60 |

Thus, comparative thermosensitive stencil papers No. 3 and No. 4 were obtained.

COMPARATIVE EXAMPLE 5

The same copolymerized polyester film as employed in Example 1 was attached to a Japanese paper with a basis weight of 11 g/m$^2$ (comprising hemp fibers and polyester fibers with a ratio by weight of 60:40) with an adhesive of chlorinated polypropylene. In this case, the deposition amount of the adhesive was 0.5 g/m$^2$.

Thereafter, a sticking preventing agent was applied to the rear side of the polyester film, opposite to the Japanese paper side, with respect to the polyester film, so that a sticking preventing layer was provided.

Thus, a comparative thermosensitive stencil paper No. 5 was obtained.

With respect to each of the above-prepared thermosensitive stencil papers No. 1 to No. 6 according to the present invention and comparative thermosensitive stencil papers No. 1 to No. 5, the following evaluations were made.

(1) Stability of porous resin layer formation coating liquid

The porous resin layer formation coating liquid prepared in each Example was placed in a glass bottle, and the condition of each coating liquid was visually observed. The stability of the coating liquid was evaluated on the following scales:

○: There was no separation after the coating liquid was allowed to stand for 24 hours.

Δ: There was no separation after the coating liquid was allowed to stand for 30 minutes.

X: The separation was observed within 5 minutes after the coating liquid was allowed to stand.

The results are shown in Table 4.

(2) Permeability

Each of the thermosensitive stencil papers was set in the commercially available stencil printing machine (Trademark "PRIPORT VT3820", made by Ricoh Company, Ltd.) and perforations are made in the thermoplastic resin film of each thermosensitive stencil paper corresponding to a solid image chart of 10 cm×10 cm, so that a printing master was prepared.

Then, the permeability of each printing master was measured using a commercially available measuring instrument (Trademark "Permeameter", made by Toyo Seiki Seisaku-sho, Ltd.).

The results are shown in Table 4.

(3) Bending rigidity

The bending rigidity of each thermosensitive stencil paper was measured using a commercially available stiffness tester (made by Lorentzen & Wettre Corp.). To be more specific, the stress generated when the stencil paper was caused to bend to a predetermined angle was obtained.

The results are shown in Table 4.

(4) Image density of printed image

Using the printing master prepared from each thermosensitive stencil paper, a solid image was printed on an image receiving medium using a printing ink with a viscosity of 15 Pa•s at 20° C. The image density of the printed image was measured using a densitometer.

The results are shown in Table 4.

(5) Non-printed spots in a solid image

After the printing master prepared from each thermosensitive stencil paper was set in the commercially available stencil printing machine (Trademark "PRIPORT VT3820", made by Ricoh Company, Ltd.), a solid image was printed on an image receiving medium using a printing ink with a viscosity of 15 Pa•s at 20° C. The printed image thus obtained was visually observed, and the presence of non-printed spots in the solid image was evaluated on the following scales:

○: A solid image was free of non-printed spots.

Δ: Non-printed spots were observed, but acceptable for practical use.

X: There were many non-printed spots in a solid image.

The results are shown in Table 4.

(6) Offset problem

The solid image was printed on many sheets of image receiving medium. It was visually observed whether the rear surface of the image receiving medium was stained with ink or not. The offset was evaluated on the following scales:

○: There was no offset problem.

Δ: The offset problem was observed, but acceptable for practical use.

X: The offset problem was striking and not acceptable for practical use.

The results are shown in Table 4.

TABLE 4

| | Stability of Coating Liquid | Permeability ($cm^3/cm^2 \cdot sec$) | Bending Rigidity (mN) | Image Density | Non-printed Spots | Offset |
|---|---|---|---|---|---|---|
| Ex. 1 | ○ | 32 | 16 | 1.03 | ○ | ○ |
| Ex. 2 | ○ | 31 | 15 | 1.02 | ○ | ○ |
| Ex. 3 | ○ | 31 | 16 | 1.02 | ○ | ○ |
| Ex. 4 | ○ | 30 | 17 | 1.04 | ○ | ○ |
| Ex. 5 | ○ | 29 | 18 | 1.05 | ○ | ○ |
| Ex. 6 | ○ | 29 | 17 | 1.03 | ○ | ○ |
| Comp. Ex. 1 | ○ | 0.05 | 11 | * | * | ○ |
| Comp. Ex. 2 | X | 34 | 15 | 1.03 | Δ | ○ |
| Comp. Ex. 3 | X | 8 | 16 | 0.75 | X | ○ |
| Comp. Ex. 4 | X | 0.06 | 17 | 0.30 | X | ○ |
| Comp. Ex. 5 | ○ | 220 | 130 | 1.12 | Δ | X |

*No printing ink permeated through the porous resin layer, so that the measurement was impossible.

EXAMPLE 7

2.5 parts by weight of a commercially available polyvinyl butyral resin (Trademark "BH-S", made by Sekisui Chemical Co., Ltd.) and 0.2 parts by weight of a commercially available low-molecular weight emulsifier (Trademark "GF185", made by Toho Chemical Industry Co., Ltd.) were uniformly dissolved in 28.8 parts by weight of ethyl acetate with stirring.

To the above-prepared ethyl acetate solution, 17.5 parts by weight of water, which was a non-solvent with respect to the polyvinyl butyral resin, were added dropwise with stirring, whereby an emulsion was prepared. This emulsion was remarkably stable, without causing the separation of the resin component after allowed to stand for a whole day and night.

The above-mentioned emulsion of polyvinyl butyral resin was uniformly coated on a thermoplastic film with a thickness of 2.0 μm using a wire bar. Then, the coated liquid was exposed to hot air of 50° C. for 4 minutes.

Thus, a porous resin layer having pores with uniform pore particles was provided on the thermoplastic film.

A sticking preventing layer was provided on the back side of the thermoplastic film in the same manner as in Example 1.

A thermosensitive stencil paper No. 7 according to the present invention was obtained.

EXAMPLE 8

2.5 parts by weight of a commercially available polyvinyl butyral resin (Trademark "BH-S", made by Sekisui Chemical Co., Ltd.) were uniformly dissolved in 28.8 parts by weight of ethyl acetate with stirring.

To the above-prepared ethyl acetate solution, 25 parts by weight of a 0.5% aqueous solution of methyl cellulose were added dropwise with stirring, whereby an emulsion was prepared. This emulsion was remarkably stable without causing the separation of the resin component after allowed to stand for a whole day and night.

The above-mentioned emulsion of polyvinyl butyral resin was uniformly coated on a thermoplastic film with a thickness of 2.0 μm using a wire bar. Then, the coated liquid was exposed to hot air of 50° C. for 4 minutes.

Thus, a porous resin layer having pores with uniform pore particles was provided on the thermoplastic film.

A sticking preventing layer was provided on the back side of the thermoplastic film in the same manner as in Example 1.

A thermosensitive stencil paper No. 8 according to the present invention was obtained.

EXAMPLE 9

2.5 parts by weight of a commercially available polyvinyl butyral resin (Trademark "BH-S", made by Sekisui Chemical Co., Ltd.) and 0.25 parts by weight of a commercially available high-molecular weight emulsifier (Trademark "JONCRYL 352", made by Johnson Polymer Corporation) were uniformly dissolved in 28.8 parts by weight of ethyl acetate with stirring.

To the above-prepared ethyl acetate solution, 20 parts by weight of a 0.5% aqueous solution of polyvinyl alcohol with a saponification degree of 88.0% (Trademark "Poval 205", made by Kuraray Co., Ltd.) were added dropwise with stirring, whereby an emulsion was prepared. This emulsion was remarkably stable even after allowed to stand for a long period of time.

The above-mentioned emulsion of polyvinyl butyral resin was uniformly coated on a thermoplastic film with a thickness of 2.0 μm using a wire bar. Then, the coated liquid was exposed to hot air of 50° C. for 4 minutes.

Thus, a porous resin layer having pores with uniform pore particles was provided on the thermoplastic film.

A sticking preventing layer was provided on the back side of the thermoplastic film in the same manner as in Example 1.

A thermosensitive stencil paper No. 9 according to the present invention was obtained.

EXAMPLE 10

2.5 parts by weight of a commercially available polyvinyl butyral resin (Trademark "#4000-1", made by Denki Kagaku Kogyo K.K.) and 0.5 parts by weight of a commercially available high-molecular weight emulsifier (Trademark "JONCRYL 352", made by Johnson Polymer Corporation) were uniformly dissolved and dispersed in 28.8 parts by weight of methyl alcohol with stirring.

To the above-prepared mixture, 15 parts by weight of a commercially available aliphatic saturated hydrocarbon (Trademark "Isopar G", made by Exxon Chemical Japan Ltd.) containing a commercially available low-molecular weight emulsifier (Trademark "GF185", made by Toho Chemical Industry Co., Ltd.) at a concentration of 0.1% were added dropwise with stirring, whereby an emulsion was prepared.

The above-mentioned emulsion of polyvinyl butyral resin was uniformly coated on a thermoplastic film with a thickness of 2.0 μm using a wire bar. Then, the coated liquid was exposed to hot air of 50° C. for 4 minutes.

Thus, a porous resin layer having pores with uniform pore particles was provided on the thermoplastic film.

A sticking preventing layer was provided on the back side of the thermoplastic film in the same manner as in Example 1.

A thermosensitive stencil paper No. 10 according to the present invention was obtained.

COMPARATIVE EXAMPLE 6

2.5 parts by weight of a commercially available polyvinyl butyral resin (Trademark "BH-S", made by Sekisui Chemical Co., Ltd.) were uniformly dissolved in 28.8 parts by weight of ethyl acetate.

To the above-prepared ethyl acetate solution, 12 parts by weight of water were added dropwise with stirring, whereby a dispersion was prepared. This dispersion caused the separation and became unstable after allowed to stand for one hour.

The above-mentioned dispersion of polyvinyl butyral resin was uniformly coated on a thermoplastic film with a thickness of 2.0 μm using a wire bar. Then, the coated liquid was exposed to hot air of 50° C. for 4 minutes.

Thus, a porous resin layer having pores with non-uniform pore particles was provided on the thermoplastic film.

A comparative thermosensitive stencil paper No. 6 was obtained.

With respect to each of the above prepared thermosensitive stencil papers No. 7 to No. 10 according to the present invention and comparative thermosensitive stencil paper No. 6, the previously mentioned evaluations (1), (3), (5) and (6) were made. Further, the area ratio of pores formed in the porous resin layer to the entire surface area of the porous resin layer was obtained in the following manner.

(7) Area ratio of pores to entire surface area of porous resin layer

A picture of the surface of the porous resin layer was taken under an electron microscope at 1,000 power. The pore portions in the picture were subjected to image processing using a commercially available apparatus (Trademark "LA-555D", made by Pias Co., Ltd.), whereby each pore was converted to a true round so as to obtain the pore particle, and, the area ratio of the pores with a diameter of 5 μm or more to the entire surface are of the porous resin layer was calculated.

The results are shown in Table 5.

TABLE 5

| | Stability of Coating Liquid | Area Ratio of Pores (%) | Bending Rigidity (mN) | Non-printed Spots | Offset |
|---|---|---|---|---|---|
| Ex. 7 | ○ | 52 | 23 | ○ | ○ |
| Ex. 8 | ○ | 56 | 28 | ○ | ○ |
| Ex. 9 | ○ | 58 | 24 | ○ | ○ |
| Ex. 10 | ○ | 45 | 22 | ○ | ○ |
| Comp. Ex. 6 | X | 30 | 20 | Δ | X |

As previously explained, the porous resin layer formation coating liquid for use in the present invention is stable for an extended period of time, so that the quality of the coating liquid can be stably maintained in the course of the coating operation. Further, high speed coating can be attained, thereby increasing the production efficiency.

In addition, the thermosensitive stencil paper of the present invention exhibits sufficient stiffness and excellent sensitivity to the making of perforations in the thermoplastic resin film. As a result, a solid image free of non-printed spots can be obtained, and occurrence of the offset problem can be minimized.

Japanese Patent Application No. 09-350024 filed Dec. 4, 1997 and Japanese Patent Application filed Dec. 2, 1998 are hereby incorporated by references.

What is claimed is:

1. A thermosensitive stencil paper comprising a thermoplastic resin film and a porous resin layer which is provided on said thermoplastic resin film by coating a porous resin layer formation coating liquid comprising a water-in-oil emulsion of a resin on said thermoplastic resin film and drying said coating liquid, wherein said water-in-oil emulsion is prepared by use of an emulsifier.

2. The thermosensitive stencil paper as claimed in claim 1, wherein said resin for use in said water-in-oil emulsion comprises a thermoplastic resin.

3. The thermosensitive stencil paper as claimed in claim 2, wherein said thermoplastic resin is a polyvinyl butyral resin.

4. The thermosensitive stencil paper as claimed in claim 1, wherein said thermoplastic resin film exhibits a permeability of 1.0 to 157 $cm^3/cm^2 \bullet sec$ when perforations are made in said thermoplastic resin film corresponding to a solid image portion so that said perforations may occupy an area of 40% or more of the total area of said solid image portion.

5. The thermosensitive stencil paper as claimed in claim 1, wherein said porous resin layer formation coating liquid further comprises a filler.

6. The thermosensitive stencil paper as claimed in claim 1, wherein said thermosensitive stencil paper exhibits a bending rigidity of 5 mN or more.

7. A thermosensitive stencil paper comprising a thermoplastic resin film and a porous resin layer which is provided on said thermoplastic resin film by coating a porous resin layer formation coating liquid comprising a water-in-oil emulsion of a resin on said thermoplastic resin film and drying said coating liquid, wherein said resin for use in said water-in-oil emulsion comprises a thermoplastic resin, and said thermoplastic resin is a polyurethane resin.

8. The thermosensitive stencil paper as claimed in claim 7, wherein said water-in-oil emulsion of said polyurethane resin is prepared in such a manner that finely-divided particles are dispersed in a solution of said polyurethane resin to prepare a dispersion, said finely-divided particles being produced by allowing an active hydrogen containing polyfunctional compound to react with an organic polyisocyanate, and said dispersion is prepared into said water-in-oil emulsion using an emulsifier.

9. A thermosensitive stencil paper comprising a thermoplastic resin film and a porous resin layer which is provided on said thermoplastic resin film by coating a porous resin layer formation coating liquid comprising a water-in-oil emulsion of a resin on said thermoplastic resin film and drying said coating liquid, wherein said porous resin layer has pores with a diameter of 5 $\mu$m or more therein, with said pores occupying an area of 4 to 80% of the entire surface area of said porous resin layer, provided that the pore diameter is obtained by converting the form of a pore into a true round.

* * * * *